United States Patent [19]
Walker

[11] Patent Number: 4,781,665
[45] Date of Patent: Nov. 1, 1988

[54] POWER-DELIVERY BELT-TENSIONING SYSTEM

[75] Inventor: Dean M. Walker, Fort Collins, Colo.

[73] Assignee: Walker Manufacturing Company, Fort Collins, Colo.

[21] Appl. No.: 91,412

[22] Filed: Aug. 31, 1987

[51] Int. Cl.⁴ .............................................. F16H 7/12
[52] U.S. Cl. .................................... 474/133; 56/16.6; 474/135
[58] Field of Search ............... 474/101, 109, 111, 113, 474/114, 115, 117, 133, 135; 56/16.6

[56] References Cited
U.S. PATENT DOCUMENTS 3,762,229 10/1973 Johnson ........................ 474/135 X
4,589,249 5/1986 Walker et al. ..................... 56/16.6

Primary Examiner—Thuy M. Bui
Attorney, Agent, or Firm—Hugh H. Drake

[57] ABSTRACT

A first pulley is coupled by a flexible belt to a second pulley for delivering power from a source to a driven device. An idler pulley is urged against the belt to create tension therein. A cam, coupled for swinging movement to the idler pulley, faces against a cam guide in a manner to vary the spacing between the guide and the idler pulley in correspondence with the amount of swinging movement. A spring secured to the cam nudges the latter in a direction to incrementally increase the spacing between the guide and the pulley in order to maintain a pre-selected degree of tension in the belt upon the occurrence of a surge in power delivered from the source to the driven device with consequent incremental permanent stretching of the belt.

6 Claims, 2 Drawing Sheets

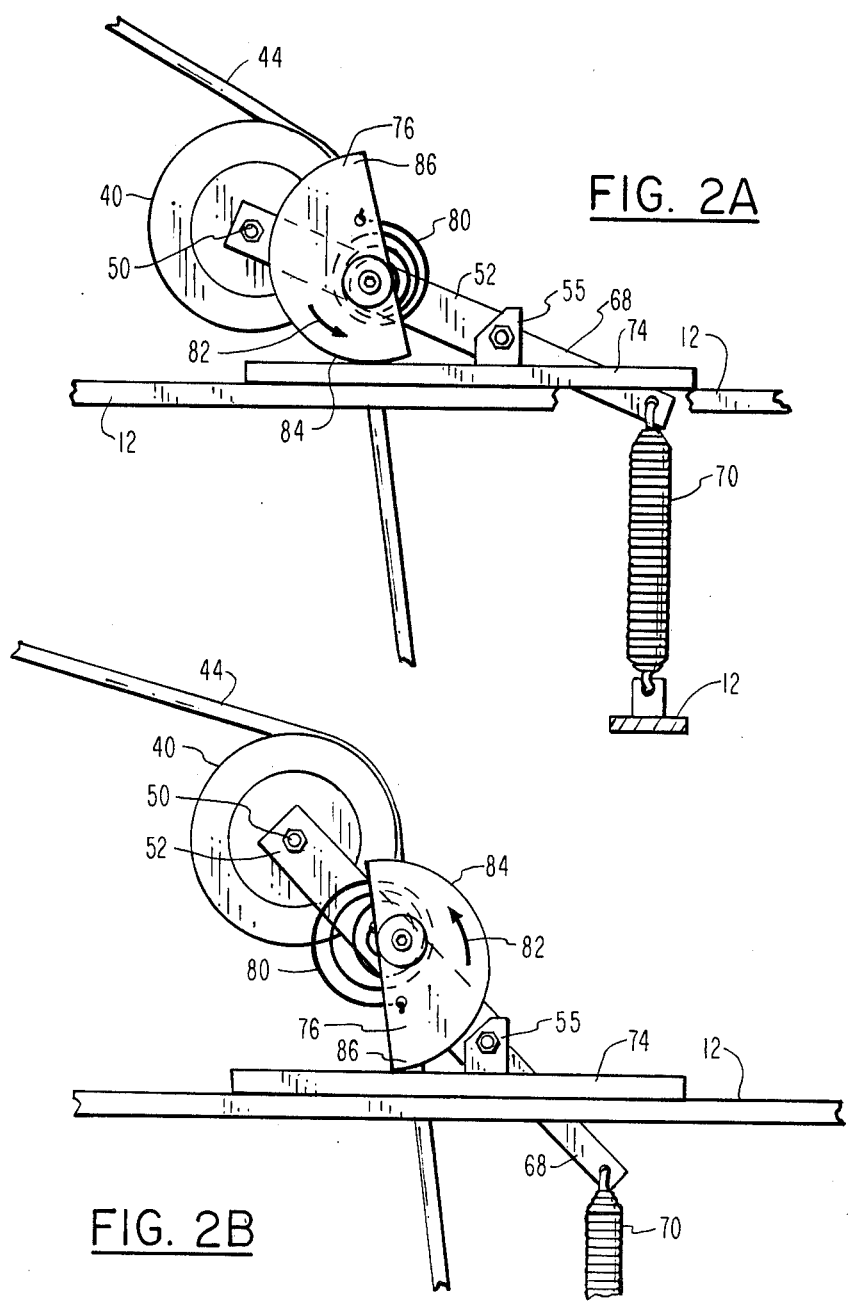

POWER-DELIVERY BELT-TENSIONING SYSTEM

The present invention pertains to a power-delivery belt-tensioning system. More particularly, it relates to a system wherein incremental increase of tension in a belt, during operation, is compensated.

Flexible belts find widespread use for delivering rotary motive power from a source to a driven device. A belt is typically mounted to form a loop encircling respective driving and driven pulleys or rollers.

One example of such usage is to be found in U.S. Pat. No. 4,589,249, issued May 20, 1986. A vehicular grass mower employs a number of flexible belts for coupling driving elements to driven elements. In two instances, an idler pulley is incorporated for maintaining sufficient tension in the corresponding belt at all times during operation. In a third instance, the swinging movement of a third pulley, toward and away from the belt, is manually controlled in order to obtain a clutching action, selectively permitting slippage of the flexible belt with respect to the pulleys.

Over a period of time, such belts tend to wear. The inclusion of an idler pulley tends to take up slack in the belt which increase as a result of that wear or which possibly may arise by reason of aging of the belt and consequent stretching. Except when a swingable pulley is to be used to permit deliberate slippage of the belt and thereby perform a clutching function, any slippage of the belt with respect to a pulley is highly undesirable, because it causes undue wear on the belt which may cause premature failure of proper operation.

A familiar utilization of an endless flexible belt is the so-called fan belt employed in automotive vehicles. Besides causing rotation of the fan, that belt typically also delivers power to the generator or alternator, and it may at the same time apply power to other devices such as a water pump. It is commonplace to mount the alternator in a manner to be swingable toward and away from the belt for adjustment of belt tension. That adjustment is accomplished by fixing the swingable position of the alternator with a regard to a slotted holding bracket. With a nut and bolt loosened, the mechanic typically forces the alternator against the belt until the tension induced therein appears to be sufficient as detected by pressing on the belt with his finger. When its tightness feels adequate, the nut is tightened on the bolt.

With that approach to belt tightening, there often is a tendency to create excessive tension in the belt as a result of which it is caused during operation to permanently stretch rather quickly and, thus, become too loose. On occasion, excessive tension may even cause the belt to break. At least, a belt which is stretched too tightly tends to exhibit undue wear on its sides when the belt has the frequent cross-sectional shape of a truncated "V" to mate with the correspondingly-shaped peripheral valleys defined in the pulleys.

Apparatus which incorporates a belt driving system often is subject to a change in the level of power available that is to be delivered to the driven pulley. This may be effected by increasing the power delivered from the power source as, for example, to cause a vehicle to accelerate or to increase the speed of operation of some other machine. The same change may be experienced when a clutch in the system is engaged. Especially troublesome can be a sudden surge in the power delivered. That undesirably may lead to a consequent increase of tension in the belt followed by a subsequent relaxation of tension.

At least usually, an associated idler pulley responds too slowly to avoid slippage when the belt suddenly becomes slack. With slippage, there is consequent wear on the belt. Such wear is found to be most severe when a resiliently-loaded idler pulley is placed in the tension side, rather than the slack side, of the belt.

It is, accordingly, a generaly object of the present invention to provide a new and improved belt-tensioning system in which belt slippage is eliminated or at least reduced.

Another object of the present invention is to provide such a system that avoids the occurrence of slippage arising when tension in a belt is relaxed following the occurrence of a surge in delivered power.

A further object of the present invention is to compensate for normal stretching of the belt by holding an idler pulley in proper position to induce maximum desired tension, notwithstanding the occurrence of surges in delivered power.

A power-delivery belt-tensioning system in accordance with the invention includes a source of rotary motive power and a first pulley mounted for rotation about a predetermined axis together with means for coupling the power from that source to the pulley. A second pulley is mounted for rotation about a given axis spaced from and parallel to the predetermined axis. A driver device, responsive to the rotary power, is coupled for rotary power delivered from the second pulley to the driven device. A flexible endless belt is seated on and circles around the first and second pulleys to deliver power from the first pulley to the second pulley. An idler pulley is mounted for rotation about another axis parallel to that given axis and is displaceable to move toward and away from the belt with the idler pulley being aligned with the other pulleys to seat against the belt.

The power delivery system is associated with means for changing the level of power available to be delivered to the driven device, and the idler pulley is urged against the belt to create tension therein. Means responsive to a surge in power delivered from the source to the driven device, with consequent incremental increase of tension in the belt, maintains a preselected degree of tension in the belt upon cessation of the surge in power.

The features of the present invention which are believed to be patentable are set forth with particularity in the appended claims. The organization and manner of operation in one specific embodiment of the invention, together with further objects and advantages thereof, may be best understood by reference to the following description taken in conjunction with the accompanying drawings, in the several figures of which like reference numerals identify like elements. and in which:

FIG. 2A is an elevational view of a subassembly utilized in the system of FIG. 1; and FIG. 2B is a view similar to FIG. 2A but with parts differently positioned.

DESCRIPTION OF THE PREFERRED EMBODIMENT

Figure 1:
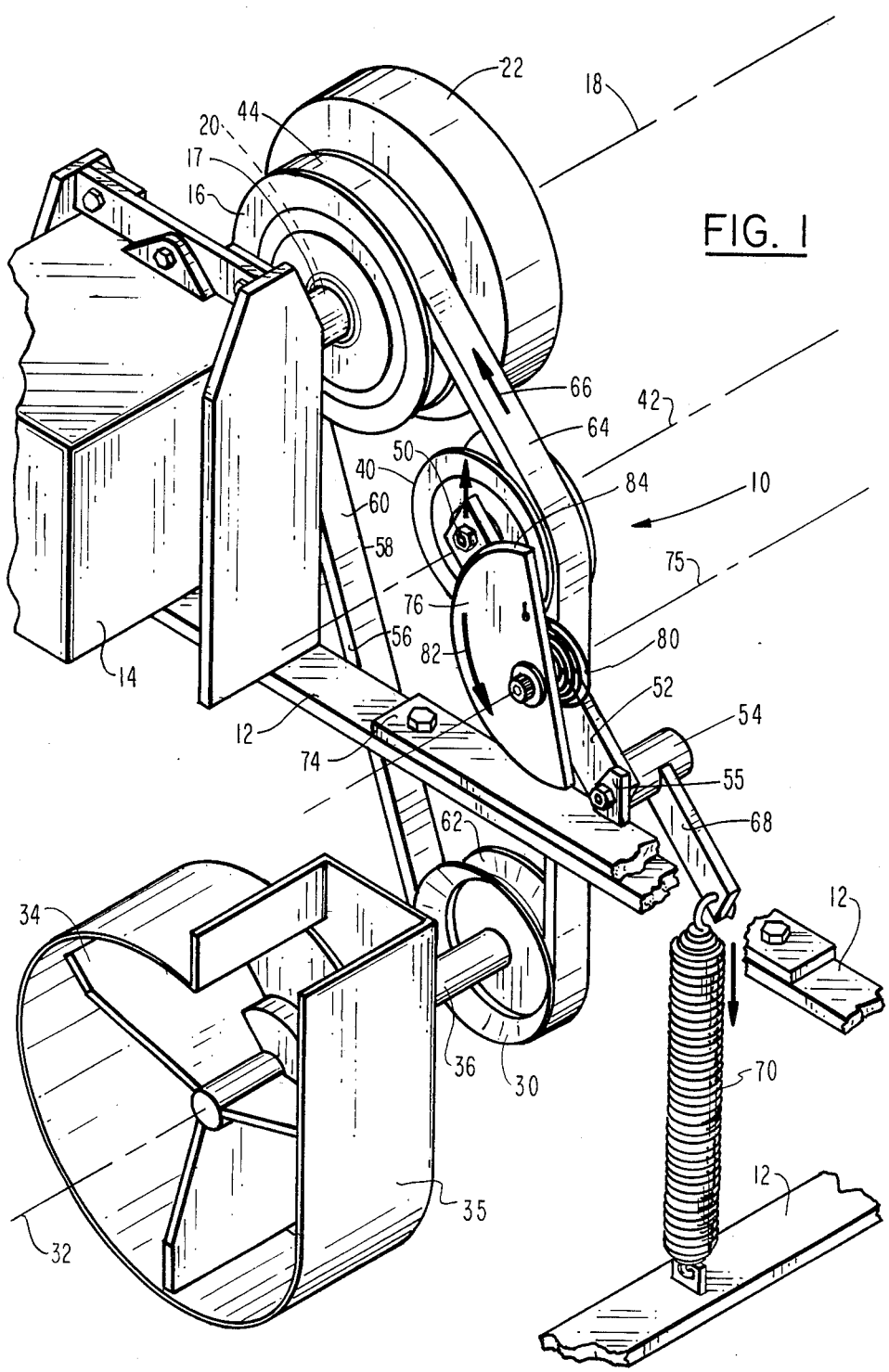
FIG. 1 is a fragmentary isometric view of a belt-tensioning system which embodies the present invention.

A power delivery belt-tensioning system 10 is supported from a chassis or framework 12 which may be either vehicular or stationary. Mounted within framework 12 is a power source, such as a gasoline or gas engine or an electric motor, which delivers rotary motive power. In this specific embodiment, power source 14 is a gearbox which makes power available from a gasoline engine as used in apparatus like that shown and described in the aforesaid U.S. Pat. No. 4,589,249.

A first pulley 16 is mounted on a sleeve 17 for rotation around a predetermined axis 18. A shaft 20, projecting through sleeve 17, couples power from source 14 to a conventional clutch 22. Clutch 22 is caused to engage and disengage by an operating control not specifically illustrated but which, for example, is a switch lever available to an operator. When engaged, clutch 22 delivers the power available on to pulley 16.

A second pulley 30 is mounted for rotation about a given axis 32 spaced from and parallel to axis 18. A driven device 34 responds to rotary power through being coupled by a shaft 36 to pulley 30. As shown specifically herein, driven device 34 is the impeller of a blower 35. When power source 14 includes gasoline engine 34 in the aforementioned U.S. Pat. No. 4,589,249, for example, its pulley 46 is the first pulley and its pulley 50 becomes the second pulley herein. Therein, a shaft 54 couples rotary power from the second pulley either to a gear box 58 or another pulley 116 from which power is ultimately delivered to a blower.

In the present embodiment, an idler pulley 40 is mounted for rotation about another axis 42 parallel to given axis 32. Circled around pulleys 16 and 30 is a flexible endless belt 44 which serves to deliver power from the first pulley to the second pulley. Idler pulley 40 is displaceable to move toward and away from belt 44, and the idler pulley is aligned with the first and second pulleys in order that it seats against belt 44.

As shown, idler pulley 40 rotates upon a shaft 50 which projects from one end portion a rigid bar 52 fixedly secured near its other end to a collar 54 mounted by a stub 55 from framework 12 to be rotatable about its axis. The particular form of belting incorporated herein is that commonly known as a V belt which actually is in the form of a truncated V so as to define side walls 56 and 58 on either side of an interior flat 60. The different pulleys, correspondingly, each define a valley as at 62 on pulley 30 and shaped to have a matching cross section into which belt 44 is received.

Clutch 22, of course, serves to change the level of power available to be delivered to driven device 34. Alternatively, a speed control operator for the engine which drives source 14, such as throttle 130 in the aforementioned patent, may be changed to adjust the level of power. In the case either of causing a powerup at the power source or engagement of the clutch, a surge in power is delivered from source 14 to driven device 34. That power surge creates a consequent incremental increase in tension in belt 44. Herein, that tension occurs in the portion 64 of belt 44 arriving at pulley 16 as indicated by arrow 66. Thus, idler pulley 40 is located on the tension side of the endless belt.

For maintaining tension in belt 44 at all times, an arm 68 projects laterally from collar 54 to which arm 68 is secured. Attached to the free end of arm 68 is a tension spring 70 that, in turn, is fastened at its other end to framework 12. Secured to or formed as a part of framework 12 is a cam guide 74. Pivotally coupled to bar 52, for swinging movement about an axis 75, is a cam 76. Cam 76 is positioned so that its lower, peripheral surface actually defines the cam that faces against cam guide 74.

Cam 76 has a shape which causes a variation of spacing between guide 74 and pulley axis 42 in correspondence with the amount of swinging movement of cam 76. A spring 80 is secured between cam 76 and bar 52 to urge cam 76 to move in the direction indicated by arrow 82. As best seen in FIGS. 2A and 2B, cam 76 has a surface 84 that faces cam guide 74 and which curves eccentrically from a far end portion 86 toward the other end portion and with respect to axis 75 and, thus, effectively with respect to axis 42. In one operative prototype, those two axes coincided.

FIG. 2A represents a non-worn or non-stretched belt. FIG. 2B applies for a belt worn and/or stretched to about the limit of operability of cam 76 to lock in appropriate tension.

With a pre-selected degree of tension induced in belt 44 in normal operation, cam 76 under the pull of spring 80 remains in a fixed position as pressed against cam guide 74. Upon an incremental increase in tension as a result of a surge in power delivered, belt portion 64 tends to tighten against idler pulley 40 and, thus, to swing idler pulley 40 against the pull of its tension spring 70. Without the function of cam 76, a subsequent cessation of the power surge would slacken belt 44 and permit slippage of the belt on at least one pulley before pulley spring 70 could regain control. Of course, such slippage would result in undesired wear of the belt.

With the arrangement shown, however, relaxation in the tension within belt 44 will enable spring 80 to nudge cam 76 in the direction of arrow 82 thereby to move idler pulley 40 in this case upwardly and maintain the desired pre-selected tension. Spring 80 is calibrated in correspondence with the change in curvature of surface 84 and the characteristics of belt 44.

Advantage also is taken of the force of gravity in the system illustrated. That is, the eccentricity of cam follower 76 causes its center of mass to be toward end portion 86. Therefore, the force of gravity tends, by itself, to cause follower 76 to swing in the direction of arrow 82. If desired, the effect of that force may be increased by causing cam follower 76 to be significantly heavier toward end portion 86 and, indeed, additional weight may be added for this purpose near end portion 86. If the difference in mass is sufficiently large, it is possible to rely entirely upon the force of gravity acting upon that offset mass, and spring 80 will not be needed. Its inclusion is preferred, however, because it acts with certainty.

The end result of the foregoing is that, for normal operation, movement of idler pulley 40 under the urging of spring 70 serves to create a pre-selected degree of tension in belt 44. At the same time, the engagement of cam 76 against cam guide 74, under the nudging of spring 80, maintains that degree of tension as belt 44 may wear or stretch during normal use. Yet, cam 76 also acts to lock idler pulley 40 against movement, and thus assist the urging of spring 70, upon a surge of power which creates an incremental increase in tension within belt 44. Cam 76, therefore, guards against subsequent slippage, and hence wear, that otherwise would occur following cessation of the power surge.

As shown, idler pulley 40 is located inside the loop defined by belt 44. In principle, pulley 40 may be located so as to be urged against the outside of belt 44. In that case, the location of cam guide 74 and cam 76 correspondingly is moved and it could be cam guide 74 which was coupled to pulley 40, while cam 76 would be separately suspended for swingability.

While a particular embodiment of the invention has been shown and described, and various alternatives and modifications have been taught, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. A power-delivery belt-tensioning system comprising:
   a source of rotary motive power;
   a first pulley mounted for rotation about a predetermined axis;
   means for coupling said power from said source to said pulley;
   a second pulley mounted for rotation about a given axis spaced from and parallel to said predetermined axis;
   a driven device responsive to rotary power;
   means for coupling rotary power from said second pulley to said driven device;
   a flexible endless belt seated on and circling around said first and second pulleys to deliver power from said first pulley to said second pulley;
   an idler pulley mounted for rotation about another axis parallel to said given axis and displaceable to move said idler pulley toward and away from said belt with said idler pulley being aligned with said first and second pulleys to seat against a portion of said belt and, during operation, normally said belt in a preselected degree of tension;
   means associated with said power delivery system for changing the level of power available to be delivered to said driven device;
   means for resiliently urging said idler pulley against said belt to create tension in said belt;
   and means responsive to a surge in power delivered from said source to said driven device, with consequent incremental increase of tension in said belt, for maintaining said preselected degree of tension in said belt upon cessation of said surge in power.

2. A power-delivery belt-tensioning system comprising:
   a source of rotary motive power;
   a first pulley mounted for rotation about a predetermined axis;
   means for coupling said power from said source to said pulley;
   a second pulley mounted for rotation about a given axis spaced from and parallel to said predetermined axis;
   a driven device responsive to rotary power;
   means for coupling rotary power from said second pulley to said driven device;
   a flexible endless belt seated on and circling around said first and second pulleys to deliver power from said first pulley to said second pulley;
   an idler pulley mounted for rotation about another axis parallel to said given axis and displaceable to move said idler pulley toward and away from said belt with said idler pulley being aligned with said first and second pulleys to seat against a portion of said belt which, during operation, is placed in tension;
   means associated with said power delivery system for changing the level of power available to be delivered to said driven device;
   means for resiliently urging said idler pulley against said belt to create tension in said belt;
   means responsive to a surge in power delivered from said source to said driven device, with consequent incremental increase of tension in said belt, for maintaining a preselected degree of tension in said belt upon cessation of said surge in power;
   a cam guide mounted in a location spaced from and facing said idler pulley;
   a cam effectively pivotally coupled to said idler pulley for swinging movement about an axis and positioned to face against said cam guide with said cam having a shape which varies the spacing between said cam guide and said other axis in correspondence with the amount of said swinging movement;
   and means effective upon the occurrence of said increase of tension in said belt for nudging said cam in a given direction which incrementally increases said spacing between said cam guide and said other axis to maintain said preselected degree of tension in said belt.

3. A belt-tensioning system as defined in claim 2 in which said nudging means includes a resilient element fixedly secured at one end and secured at its other end to said cam.

4. A belt-tensioning system as defined in claim 2 in which said cam is formed and disposed to offset its center of mass with respect to said cam guide and in which said nudging means includes the force of gravity acting upon said mass.

5. A belt-tensioning system as defined in claim 2 in which said other axis and said idler pulley are located inside the loop defined by said belt.

6. A power-delivery belt-tensioning system comprising:
   a source of rotary motive power;
   a first pulley mounted for rotation about a predetermined axis;
   means for coupling said power from said source to said pulley;
   a second pulley mounted for rotation about a given axis spaced from and parallel to said predetermined axis;
   a driven device responsive to rotary power;
   means for coupling rotary power from said second pulley to said driven device;
   a flexible endless belt seated on and circling around said first and second pulleys to deliver power from said first pulley to said second pulley;
   an idler pulley mounted for rotation about another axis parallel to said given axis and displaceable to move said idler pulley toward and away from said belt with said idler pulley being aligned with said first and second pulleys to seat against said belt during operation;
   means associated with said power delivery system for changing the level of power available to be delivered to said delivery device;
   means for resiliently urging said idler pulley against said belt to create tension in said belt;
   a cam guide mounted in a location spaced from and facing said idler pulley;
   a cam effectively pivotally coupled to said idler pulley for swinging movement about an axis and positioned to face against said cam guide with said cam having a shape which varies with spacing between said cam guide and said other axis in correspondence with the amount of said swinging movement;

and means responsive to a surge in power delivered from said source to said driven device, with consequent incremental increase of tension in said belt, for nudging said cam in a given direction which incrementally increases said spacing between said cam guide and said other axis to maintain a preselected degree of tension in said belt upon cessation of said surge in power.

* * * * *

UNITED STATES PATENT AND TRADEMARK OFFICE
CERTIFICATE OF CORRECTION

PATENT NO. : 4,781,665

DATED : November 1, 1988

INVENTOR(S) : Dean M. Walker

It is certified that error appears in the above-identified patent and that said Letters Patent is hereby corrected as shown below:

Column 5, line 33, after "normally" insert -- place --.

Signed and Sealed this

Twenty-fifth Day of April, 1989

Attest:

DONALD J. QUIGG

Attesting Officer

Commissioner of Patents and Trademarks